United States Patent
Bostick et al.

(10) Patent No.: US 10,555,118 B1
(45) Date of Patent: Feb. 4, 2020

(54) AUTOMATIC TRANSFER OF AUDIO-RELATED TASK TO A SMART SPEAKER

(71) Applicant: International Business Machines Corporation, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/041,338

(22) Filed: Jul. 20, 2018

(51) Int. Cl.
*H04W 4/02* (2018.01)
*H04W 4/80* (2018.01)
*H04R 3/12* (2006.01)
*H04R 1/10* (2006.01)
*G06K 9/00* (2006.01)

(52) U.S. Cl.
CPC ........ *H04W 4/023* (2013.01); *G06K 9/00771* (2013.01); *H04R 1/1083* (2013.01); *H04R 3/12* (2013.01); *H04W 4/025* (2013.01); *H04W 4/80* (2018.02)

(58) Field of Classification Search
CPC ....... H04W 4/023; H04W 4/025; H04W 4/80; H04R 3/12; H04R 1/1083; G06K 9/00771
See application file for complete search history.

(56) References Cited

U.S. PATENT DOCUMENTS

| | | | |
|---|---|---|---|
| 7,050,834 B2 | 5/2006 | Harwood et al. | |
| 7,424,288 B2 | 9/2008 | Jung et al. | |
| 8,166,176 B2 | 4/2012 | Kumar et al. | |
| 2015/0331699 A1* | 11/2015 | McKillop | G06F 3/165 710/14 |
| 2018/0081523 A1* | 3/2018 | Beaumont | G06F 13/36 |

OTHER PUBLICATIONS

Gartenberg, "Repiblic Wireless is getting into hardware with a smart speakerphone", The Verge, 3 pages, https://www.theverge.com/circuitbreaker/2017/11/17/16671136/republic-wireless-anywhere-hq-smart-speakerphone-assistant.

* cited by examiner

*Primary Examiner* — Wayne H Cai
(74) *Attorney, Agent, or Firm* — Marcus Walker

(57) ABSTRACT

Aspects of the present invention disclose a method for managing audio on a mobile device based on environmental factors. The method includes one or more processors determining that an audio-related task initiates on a mobile device. The method further includes determining whether a location of the mobile device is within a threshold proximity to a paired smart speaker. In response to determining that the location of the mobile device is within the threshold proximity, the method further includes determining a first set of environmental factors associated with a physical environment of the paired smart speaker based on data associated with the mobile device, the paired smart speaker, and the corresponding operating environment. The method further includes determining whether to transfer the audio-related task from the mobile device to the paired smart speaker based on analyzing of the first set of environmental factors in comparison to user preferences.

20 Claims, 4 Drawing Sheets

AUTOMATIC TRANSFER OF AUDIO-RELATED TASK TO A SMART SPEAKER

BACKGROUND OF THE INVENTION

The present invention relates generally to mobile devices, and more particularly to an automatic transfer of an audio-related task.

In recent years developments in playing audio from a mobile device on a speaker over a wireless network (e.g., via Wi-Fi, Bluetooth™, etc.) have grown. Smart speakers are stand-alone speakers, typically placed in a home or office environment, which combine speakers with a processor and a microphone. Commercial examples of smart speakers are Amazon Echo™ and Google Home™. A mobile device is paired to a smart speaker so that the audio (e.g., digital assistant commands, phone calls, music or other audio broadcasts, etc.) from a mobile device is routed to the smart speaker.

A Personal Area Network (PAN) is a computer network used for data transmission between devices. Bluetooth™ is a type of Wireless Personal Area Network (WPAN). The Bluetooth™ technology is becoming a popular communication method for devices, such as mobile devices, computers, and household electric appliances.

Cognitive analytics combines the use of cognitive computing and analytics. Cognitive computing combines artificial intelligence and machine-learning algorithms, in an approach that attempts to reproduce the behavior of the human brain. Analytics is the scientific process of transforming data into insights for making better decisions. Cognitive analytics applies intelligent technologies to bring unstructured data sources within reach of analytics processes for decision making.

SUMMARY

Aspects of the present invention disclose a method, computer program product, and system for managing audio activity on a mobile device based on environmental factors. The method includes one or more processors determining that an audio-related task initiates on a mobile device. The method further includes one or more processors determining whether a location of the mobile device is within a threshold proximity to a paired smart speaker. In response to determining that the location of the mobile device is within the threshold proximity to the paired smart speaker, the method further includes one or more processors determining a first set of environmental factors associated with a physical environment of the paired smart speaker based on data associated with the mobile device, the paired smart speaker, and the corresponding operating environment. The method further includes one or more processors determining whether to transfer the audio-related task from the mobile device to the paired smart speaker based on an analysis of the first set of environmental factors in comparison to a defined set of user preferences.

DETAILED DESCRIPTION

Embodiments of the present invention allow for application of cognitive analytics to a smart speaker environment that creates innovative possibilities for how a user interacts with a mobile device to manage transfers of audio-related tasks (e.g., phone calls, digital assistant communication, music, other audio broadcasts, etc.). Various embodiments of the present invention utilize factors of a smart speaker environment in proximity to a user of a mobile device to determine whether to transfer an audio-related task to a smart speaker. In response to determining that factors of the environment indicate that transfer of the audio-related task is suitable, embodiments of the present invention facilitate the transfer of the audio-related task from a mobile device of the user to the smart speaker.

Some embodiments of the present invention recognize that the environment where a smart speaker is present is suitable for transferring an audio-related task from a mobile device of a user to the smart speaker. However, factors in a smart speaker environment often change that have effect on whether the smart speaker environment is still suitable for an audio-related task. For example, if a smart speaker is operating in a noisy room, then transferring a call from a mobile device to a smart speaker is not appropriate where the noise level creates an unsuitable environment for taking a personal call.

Implementation of embodiments of the invention may take a variety of forms, and exemplary implementation details are discussed subsequently with reference to the Figures.

Figure 1:
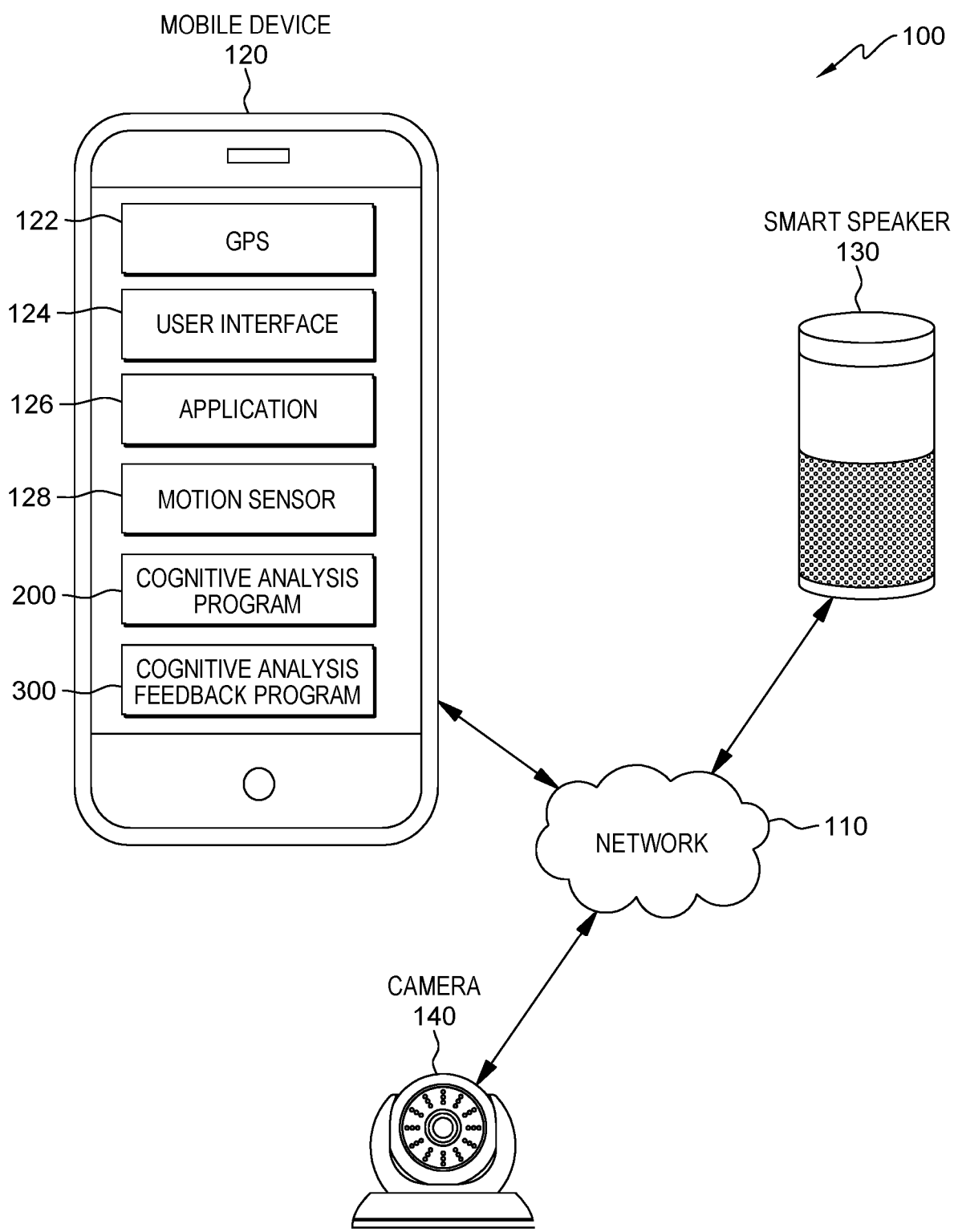
FIG. 1 is a functional block diagram of a data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

In one embodiment, data processing environment 100 includes mobile device 120, smart speaker 130, and camera 140, all interconnected over network 110. In an example embodiment, mobile device 120, smart speaker 130, and camera 140 communicate through network 110. Network 110 can be, for example, a local area network (LAN), a telecommunications network, a wide area network (WAN), such as the Internet, or any combination of the three, and include wired, wireless, or fiber optic connections. In general, network 110 can be any combination of connections and protocols, which will support communications between mobile device 120, smart speaker 130, and camera 140, in accordance with embodiments of the present invention. In an example embodiment, network 110 is representative of wireless personal area network (WPAN), which provides wireless communication capabilities for mobile device 120, smart speaker 130, and camera 140 in data processing environment 100. For example, mobile device 120 is paired with smart speaker 130 via a WPAN.

In various embodiments of the present invention, mobile device 120 may be a tablet, personal digital assistant, mobile phone, or any other device capable of executing computer readable program instructions, in accordance with embodiments of the present invention. In general, mobile device 120 is representative of any electronic device or combination of electronic devices capable of executing computer readable program instructions.

Mobile device 120 includes Global Positioning System (GPS) 122, user interface 124, application 126, motion sensor 128, cognitive analysis program 200, and cognitive analysis feedback program 300. GPS 122 is a global navigation system that provides geolocation and time information of an object. In one embodiment, GPS 122 provides geolocation and time information of mobile device 120 to cognitive analysis program 200. In another embodiment, GPS 122 provides geolocation information of the pairing of mobile device 120 and smart speaker 130 to cognitive analysis program 200.

User interface 124 is a program that provides an interface between a user of mobile device 120 and a plurality of applications (e.g., application 126) that reside on mobile device 120. A user interface, such as user interface 124, refers to the information (such as graphic, text, and sound) that a program presents to a user, and the control sequences the user employs to control the program. A variety of types of user interfaces exist. In one embodiment, user interface 124 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 124 is a script or application programming interface (API).

Application 126 is a computer program designed to run on mobile device 120. An application frequently serves to provide a user with similar services accessed on personal computers (e.g., web browser, email client, calendar, mapping program, or playing music, other media, etc.). In one embodiment, application 126 is performing an audio-related task on mobile device 120. In another embodiment, an application 126 receives a voice command from a user of mobile device 120.

Motion sensor 128 is a component of mobile device 120 that utilizes an accelerometer and gyroscope to measure the acceleration and changes in velocity of an object (i.e., mobile device 120) in space. Mobile device 120 includes an on-board motion sensor 128, which detect movement of mobile device 120. In one embodiment, motion sensor 128 detect that mobile device 120 is moving in space. For example, cognitive analysis program 200 uses data of motion sensor 128 to determine movement patterns of mobile device 120, while a user is walking and interacting with mobile device 120.

Cognitive analysis program 200 analyzes several types of inputs (e.g., audio, video, geolocation, movement patterns, etc.) from the physical environment of smart speaker 130 to determine suitability of an operating environment of a smart speaker for an audio-related task and to transfer the audio-related task from a mobile device (e.g., mobile device 120) to a smart speaker (e.g., smart speaker 130). In one embodiment, cognitive analysis program 200 receives data inputs from mobile device 120, smart speaker 130, and camera 140, which are accessible via a network 110, to determine suitability of the operating environment of the smart speaker 130 for an audio-related task in order to transfer the audio-related task from mobile device 120 to smart speaker 130. Cognitive analysis feedback program 300 continues to monitor the suitability of an operating environment of a smart speaker for transfer of an audio-related task from smart speaker 130 to mobile device 120, in accordance with embodiments of the present invention.

Smart speaker 130 is a stand-alone speaker, which includes speakers, a processor, and a microphone. In various embodiments of the present invention, an individual (via mobile device 120) utilizes smart speaker 130 to play audio, receive commands, detect ambient noise levels, and to connect with networks and devices. In one embodiment, cognitive analysis program 200 determines that the operating environment of smart speaker 130 is suitable and transfers an audio-related task of mobile device 120 to smart speaker 130 over network 110. In another embodiment, smart speaker 130 receives ambient noise data from the operating environment of smart speaker 130 via network 110. For example, the operating environment is an area within a threshold proximity (e.g., a portion of the physical environment) to smart speaker 130 that camera 140 and smart speaker 130 monitor for audio and video inputs. In another example, the operating environment of smart speaker 130 encompasses a composite of the conditions, circumstances, or influences that affect the ability of the user of mobile device 120 to utilize the capabilities of smart speaker 130.

Camera 140 is a video camera directly or indirectly connected to a device, a network, or a device connected to a network. In an example embodiment, camera 140 streams video of an area where a person or a smart speaker is present. In one embodiment, cognitive analysis program 200 accesses video data of camera 140 over network 110. In another embodiment, cognitive analysis program 200 accesses video data of camera 140 indicating that people are present in the operating environment of smart speaker 130. In another embodiment, cognitive analysis program 200 accesses video data of camera 140 indicating that a user is holding mobile device 120.

Figure 2:
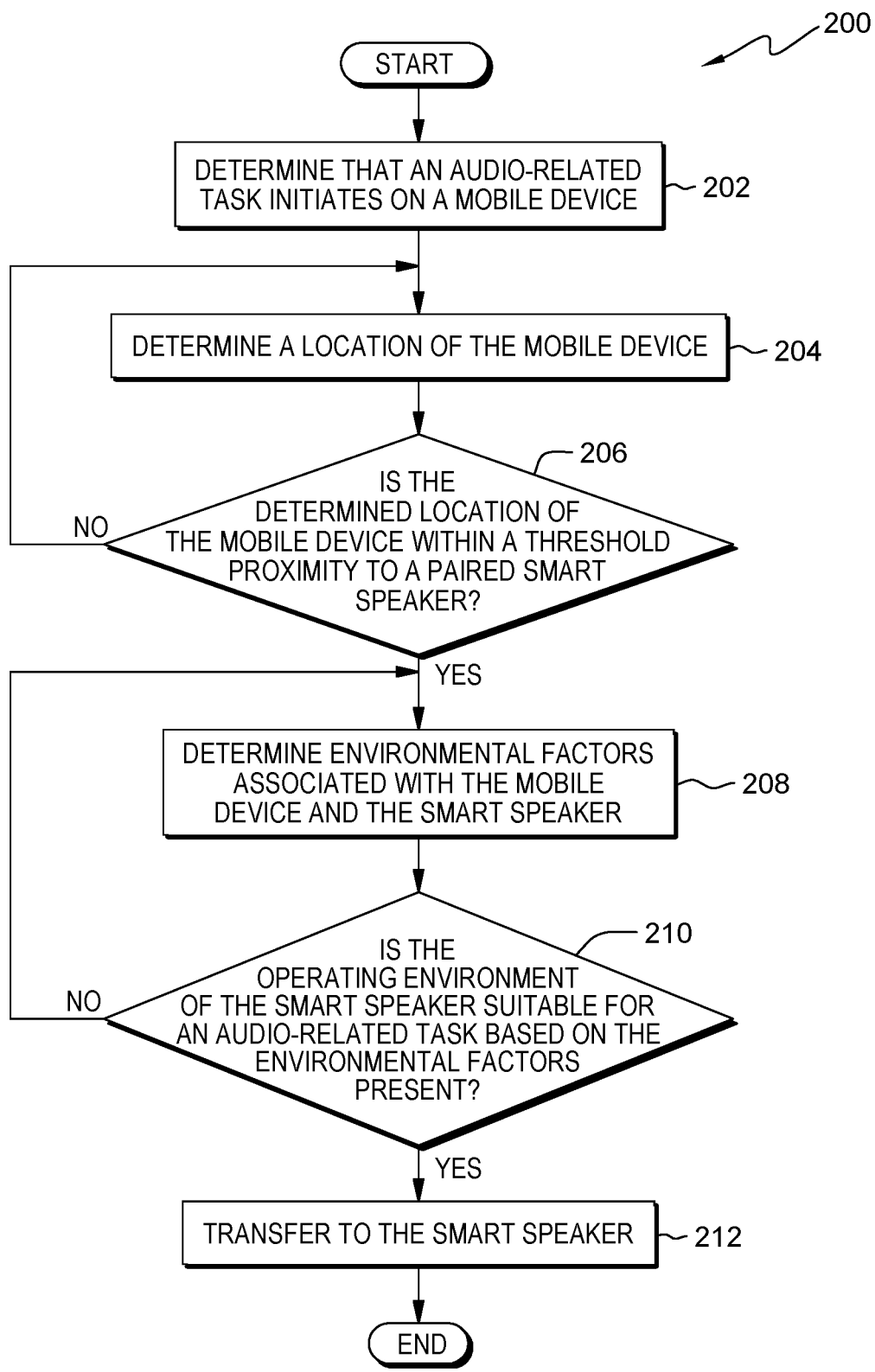
FIG. 2 is a flowchart depicting operational steps of a program for deriving suitability of an operational environment of a smart speaker for transfer of an audio-related task, in accordance with embodiments of the present invention.

FIG. 2 is a flowchart depicting operational steps of cognitive analysis program 200, a program for deriving suitability of an operational environment of a smart speaker for transfer of an audio-related task, in accordance with embodiments of the present invention. In one embodiment, cognitive analysis program 200 initiates in response to a determination that an audio-related response is occurring on mobile device 120. In another embodiment, cognitive analysis program 200 monitors mobile device 120 to detect that an audio-related task is occurring on mobile device 120.

In step 202, cognitive analysis program 200 determines that an audio-related task initiates on a mobile device. In various embodiments, an audio-related task is any occurrence where a mobile device employs audio to perform a function (e.g., playing audio, conducting a phone call, interacting with a digital assistant, etc.). In one embodiment of the present invention, cognitive analysis program 200 monitors activity on mobile device 120 for an audio-related task. For example, a user of mobile device 120 receives and answers a conference call, cognitive analysis program 200 detects that the mobile phone application is in use, the speakerphone function is enabled, and determines that an audio-related tasks is occurring. In another example, a user of mobile device 120 accesses a music playing application (e.g., application 126) via user interface 124 and plays a song. Accordingly, cognitive analysis program 200 detects that user interface 124, application 126, and a speaker of mobile device 120 is in use and determines that an audio-related task is occurring.

In another embodiment, cognitive analysis program 200 monitors mobile device 120 for the occurrence of specific audio-related tasks determined by the preferences of a user of mobile device 120. For example, cognitive analysis program 200 monitors mobile device 120 to detect opening a teleconference or music application (e.g., application 126) in accordance with the preferences of a user of mobile device 120. In another example, cognitive analysis program 200 monitors mobile device 120 to detect an audio-related tasks occurring on mobile device 120 at a threshold volume in accordance with the preferences of a user of mobile device 120. In yet another example, cognitive analysis program 200 monitors mobile device 120 to detect keywords in an audio interaction with a digital assistant in accordance with the preferences of a user of mobile device 120.

In step 204, cognitive analysis program 200 determines a location of the mobile device. In various embodiments of the present invention, cognitive analysis program 200 determines a location of a mobile device using GPS, wireless local area network (WLAN), WPAN, or any combination thereof. In one embodiment, cognitive analysis program 200 monitors GPS 122 to determine a location of mobile device 120. For example, cognitive analysis program 200 uses data from GPS 122 to determine a location of mobile device 120. In another embodiment, cognitive analysis program 200 monitors network 110 to determine a location of mobile device 120. For example, cognitive analysis program 200 monitors a WLAN that smart speaker 130 connects to, detects when mobile device 120 accesses the WLAN, and determines a location of mobile device 120. In another example, cognitive analysis program 200 monitors a WPAN of smart speaker 130, detects when mobile device 120 accesses the WPAN, and determines a location of mobile device 120.

In decision step 206, cognitive analysis program 200 determines whether the determined location of the mobile device is within a threshold proximity to a paired smart speaker. For example, cognitive analysis program 200 monitors for the location of paired smart speakers (e.g., smart speaker 130) that are in a home or an office in relation to mobile device 120. In various embodiments of the present invention, a threshold proximity is a distance at which a mobile device pairs (i.e., establishes a wireless communication connection) with a smart speaker (i.e., a threshold proximity varies based on the capabilities of the smart speaker when pairing with a mobile device via WLAN or WPAN).

In one embodiment, cognitive analysis program 200 uses the determined location of mobile device 120 (determined in step 204) and of a location of smart speaker 130 to determine whether mobile device 120 is within a threshold proximity of smart speaker 130. For example, cognitive analysis program 200 determines a GPS location of a house where a paired smart speaker (e.g., smart speaker 130) is located. In this example, cognitive analysis program 200 compares the determined location of mobile device 120 (determined in step 204) with the determined location of the house to determine whether the determined location of mobile device 120 is within a threshold proximity of smart speaker 130.

In another embodiment, cognitive analysis program 200 uses the determined location of mobile device 120 (determined in step 204), a location of smart speaker 130, and a WPAN to determine whether mobile device 120 is within a threshold proximity of smart speaker 130. For example, cognitive analysis program 200 determines a GPS location of a house where a paired smart speaker (e.g., smart speaker 130) is in an office. In this example, cognitive analysis program 200 compares the determined GPS location of mobile device 120 (determined in step 204) with the determined location of the house to verify the location of smart speaker 130 and monitors the WPAN for communication between mobile device 120 and smart speaker 130. Accordingly, cognitive analysis program 200 determines that mobile device 120 is within a threshold proximity of smart speaker 130 when cognitive analysis program 200 detects that mobile device 120 is pairing with smart speaker 130 in the office via the WPAN.

In another embodiment, cognitive analysis program 200 uses the wireless communication capabilities of smart speaker 130 to determine whether mobile device 120 is within a threshold proximity to smart speaker 130. For example, cognitive analysis program 200 monitors mobile device 120 to determine that mobile device 120 is within a threshold proximity to smart speaker 130. In one scenario, in response to detecting that mobile device 120 is pairing with smart speaker 130 via a WLAN (i.e., network 110), cognitive analysis program 200 determines that mobile device 120 is within a threshold proximity to smart speaker 130. In another scenario, in response to detecting that mobile device 120 is pairing with smart speaker 130 via a WPAN (i.e., network 110), cognitive analysis program 200 determines that mobile device 120 is within a threshold proximity to smart speaker 130. In yet another scenario, in response to detecting that mobile device 120 is accessing the WLAN, cognitive analysis program 200 can determine that the connectivity between smart speaker 130 and mobile device 120 is below a threshold (i.e. no pairing) via WPAN although smart speaker 130 and mobile device 120 are connected to the WLAN. Accordingly, cognitive analysis program 200 determines that mobile device 120 is not within a threshold proximity to smart speaker 130.

In response to determining that the determined location of the mobile device is not within the threshold proximity of the smart speaker (decision step 206, "NO" branch), cognitive analysis program 200 returns to step 204 to determine a location of the mobile device. For example, cognitive analysis program 200 continuously monitors GPS 122 to determine if mobile device 120 is within a threshold proximity of smart speaker 130. In response to determining that the determined location of the mobile device is within the threshold proximity of the smart speaker (decision step 206, "YES" branch), cognitive analysis program 200 determines environmental factors associated with the mobile device and the smart speaker (step 208).

In step 208, cognitive analysis program 200 determines environmental factors associated with a mobile device and a smart speaker. Environmental factors are identifiable elements that affect the performance of an audio-related task in the operating environment of a smart speaker and entails a composite of elements that change the operating environment. For example, audio usage and movement patterns of the mobile device, activities of the mobile device user and presence of identified people and spoken conversation and ambient noise are some of the environmental factors that affect the operating environment of a smart speaker. In one embodiment, cognitive analysis program 200 determines environmental factors associated with an operating environment of smart speaker 130 by monitoring mobile device 120, smart speaker 130, and camera 140. For example, cognitive analysis program 200 monitors mobile device 120 for audio usage and movement patterns of mobile device 120. In another example, cognitive analysis program 200 monitors smart speaker 130 for spoken conversations and ambient noise in an operating environment of smart speaker 130, and monitors camera 140 for activities of a user of mobile device 120 and for people physically present in an operating environment of smart speaker 130. The monitoring activities enables cognitive analysis program 200 to determine environmental factors associated with an operational environment of smart speaker 130.

In one embodiment, cognitive analysis program 200 monitors the operating environment of mobile device 120 and smart speaker 130 to determine environmental factors associated with audio usage within the operating environment. The audio usage environmental factor is a determination of how the user of a mobile device is interacting the mobile device for an audio-related task. For example, cognitive analysis program 200 determines that an audio usage factor exists within the operating environment when cognitive analysis program 200 detects audio activity on an earpiece of mobile device 120 that a user of mobile device 120 is using to conduct a conference call. In another example, cognitive analysis program 200 determines that an audio usage factor exists in the operating environment when cognitive analysis program 200 detects audio activity on application 126 and the speaker of mobile device 120, where a user of mobile device 120 is playing a song using mobile device 120. In another example, cognitive analysis program 200 determines that an audio usage factor exists in the operating environment when cognitive analysis program 200 detects audio activity on user interface 124 and microphone of mobile device 120, where a user of mobile device 120 via audio interaction to give commands to a digital personal assistant.

In another embodiment, cognitive analysis program 200 monitors motion sensor 128 of mobile device 120 to determine environmental factors associated with movement patterns within an operating environment of mobile device 120 and smart speaker 130. In an example embodiment, cognitive analysis program 200 monitors motion sensor 128 of mobile device 120 to determine the movement patterns of mobile device 120 while in the operating environment of mobile device 120. For example, cognitive analysis program 200 detects activity on motion sensor 128 and determines that the movement pattern indicates that the user of mobile device 120 is walking. In another example, cognitive analysis program 200 detects activity on motion sensor 128 and determines that the movement pattern indicates that the user of mobile device 120 is walking and swinging mobile device 120.

In one embodiment, cognitive analysis program 200 monitors smart speaker 130 to determine environmental factors associated with spoken conversation within an operating of environment of mobile device 120 and smart speaker 130. For example, cognitive analysis program 200 uses audio analysis of a microphone of smart speaker 130 to detect house guests having a conversation in the operating environment of smart speaker 130. In another example, cognitive analysis program 200 utilizes Natural Language Processing (NLP) to derive a topic of a conference call performed on mobile device 120. In yet another example, cognitive analysis program 200 uses NLP to derive the topic of a conversation of house guests in the operating environment of smart speaker 130, and utilizes voice identification analysis to identify a specific party of a conversation.

In another embodiment, cognitive analysis program 200 monitors smart speaker 130 to determine environmental factors associated with ambient noise within an operating of environment of mobile device 120 and smart speaker 130. For example, cognitive analysis program 200 uses a microphone of smart speaker 130 to detect multiple conversations taking place in the operating environment of smart speaker 130. In another example, cognitive analysis program 200 detects ambient noise using a microphone of smart speaker 130 and uses audio analysis to determine that a television is playing in the operating environment of smart speaker 130.

In one embodiment, cognitive analysis program 200 monitors camera 140 to determine environmental factors associated with people physically present in the operating environment of smart speaker 130. For example, cognitive analysis program 200 uses visual recognition to determine that a person is present in the operating environment of smart speaker 130. In another example, cognitive analysis program 200 uses visual recognition to determine the identity of a person present in the operating environment of smart speaker 130.

In another embodiment, cognitive analysis program 200 monitors camera 140 to determine environmental factors associated with the activities of the user of mobile device 120. For example, cognitive analysis program 200 uses visual analytics to determine that a user of mobile device 120 is walking with a bag in hand. In another example, cognitive analysis program 200 uses visual analytics to determine that a user of mobile device 120 is walking out of the operating environment of smart speaker 130.

In decision step 210, cognitive analysis program 200 determines whether the operating environment of the smart speaker is suitable for an audio-related task based on the environmental factors present in the operating environment of the smart speaker. Cognitive analysis program 200 considers user activities, attributes of background noise levels, and user privacy to determine whether the operating environment is suitable for an audio-related task. In one embodiment, cognitive analysis program 200 determines whether an operating environment of smart speaker 130 is suitable for an audio-related task based on the environmental factors present in the operating environment of smart speaker 130. For example, cognitive analysis program 200 uses the environmental factors (determined in step 208) to determine whether the operating environment of smart speaker 130 is suitable for an audio-related task.

In one embodiment, cognitive analysis program 200 determines whether an operating environment of smart speaker 130 is suitable for an audio-related task based on environmental factors and activities of a user of mobile device 120. For example, cognitive analysis program 200 determines a user of mobile device 120 is on a conference call from cognitive analysis program 200 detecting that the phone application (e.g., application 126) of mobile device 120 is in use, the speakerphone function of mobile device 120 is on, and the movement patterns received from motion sensor 128 indicates the user of mobile device 120 is holding mobile device 120 while walking into a house. Additionally, cognitive analysis program 200 uses video analytics of camera 140 to detect the user of mobile device 120 is holding mobile device 120 in one hand and grocery bags in the other hand. Accordingly, cognitive analysis program 200 determines that operating environment of smart speaker 130 is suitable for the conference call, based on the user of mobile device 120 regaining the use of one hand to carry the grocery bags.

In one embodiment, cognitive analysis program 200 determines whether an operating environment of smart speaker 130 is suitable for an audio-related task based on environmental factors and attributes of background noise levels in the operating environment of smart speaker 130. For example, cognitive analysis program 200 determines a user of mobile device 120 is on a conference call, and that multiple conversations are occurring in the operating environment of smart speaker 130 using NLP and a microphone of smart speaker 130. Accordingly, cognitive analysis program 200 determines that operating environment of smart speaker 130 is not suitable for the conference call, based on multiple conversations in the operating environment increasing the noise level and the ability of the user of mobile device 120 to efficiently conduct the conference call. In another example, cognitive analysis program 200 determines a user of mobile device 120 is on a conference call, and that a television is playing in the operating environment using audio analysis of a microphone of smart speaker 130. Accordingly, cognitive analysis program 200 determines that operating environment of smart speaker 130 is not suitable for the conference call, based on the television increasing the noise level and ability of the user of mobile device 120 to efficiently to conduct the conference call.

In one embodiment, cognitive analysis program 200 determines whether an operating environment of smart speaker 130 is suitable for an audio-related task based on environmental factors and privacy of a user of mobile device 120. In another embodiment, cognitive analysis program 200 determines the identity of people present and identifies the conversations between the people to determine whether the operating environment of smart speaker 130 is suitable for an audio-related task. In an example embodiment, cognitive analysis program 200 uses NLP and voice identification analysis to derive the substance of conversations that people within the operating environment of smart speaker 130 are having. In another embodiment, cognitive analysis program 200 uses NLP and voice identification analysis to derive the topic a conversation that the user of mobile device 120 is having. In yet another embodiment, cognitive analysis program 200 uses camera 140 to determine the identity of people physically present within the operating environment of smart speaker 130. For example, cognitive analysis program 200 determines that a user of mobile device 120 is ordering a gift for a person that is physically present in the operating environment of smart speaker 130. Accordingly, cognitive analysis program 200 determines that the operating environment is not suitable for the current call, based on the sensitivity of the topic of the call with respect to the person identified in the operating environment.

In an example embodiment, if cognitive analysis program 200 determines that at least one environmental factors exists within the operating environment of smart speaker 130 (step 208), then cognitive analysis program 200 weights the environmental factors to determine suitability of the operating environment of smart speaker 130 for an audio-related task. In various embodiments, cognitive analysis program 200 assigns each existing environmental factor a numerical weight. For example, cognitive analysis program 200 calculates the weight as a measure of a preference of the user (e.g., calculated on a scale of 0 to 100 percent according to defined user preferences). In one embodiment, cognitive analysis program 200 determines individual weights for a plurality of environmental factors based on information including, but not limited to: topics of spoken conversations, user preference of ambient noise level, type of audio-related task, and/or historical responses. For example, after many negative responses of the user (e.g., the user declining to transfer an audio-related task), cognitive analysis program 200 determines an updated threshold limit based on environmental factors that are present during negative responses of the user. In one scenario, cognitive analysis program 200 increases the threshold limit corresponding to background noise environmental factors based on the negative responses of the user.

In another example, cognitive analysis program 200 can utilize a derived topic of a conversation of a conference call and assign a weight based on the preference of the user (e.g., using historical responses a work-related call is assigned a higher weight than a personal call). In another embodiment, a user predefines rules such that a particular factor causes cognitive analysis program 200 to assign the highest weight to a particular factor and decrease the weight to all others. In this embodiment, a user can predefine rules that when a particular identified person is present a higher weight is assigned to the privacy environmental factor such that the audio-related task should not be transferred to a smart speaker.

In another embodiment, cognitive analysis program 200 compares weights of environmental factors to a user preference threshold weight to determine whether the operating environment of smart speaker 130 is suitable for an audio-related task. For example, cognitive analysis program 200 detects chatter in a room where the user of mobile device 120 walked into conducting a conference call, and determines that the chatter is between two people present in the room. Additionally, cognitive analysis program 200 assigns weights to the conference call, the two people present, and the ambient noise level of the conversation. Furthermore, cognitive analysis program 200 determines the weight assigned to the identity of the people present and the topic of the conference call do not exceed the user preference threshold weight for the privacy environmental factor. Moreover, cognitive analysis program 200 determines that the weight assigned to the ambient noise level of the chatter does not exceed the user preference threshold weight for the background noise environmental factor. Accordingly, cognitive analysis program 200 determines that the operating environment of smart speaker 130 is suitable for the conference call of the user of mobile device 120 based on the comparison of the assigned weights of the environmental factors and the user preference threshold.

In response to determining that the operating environment of the smart speaker is suitable for an audio-related task based on the environmental factors present (decision step 210, "YES" branch), cognitive analysis program 200 transfers the audio-related task to the smart speaker (step 212).

In step 212, cognitive analysis program 200 transfers an audio-related task from a mobile device to a smart speaker. In one embodiment, cognitive analysis program 200 transfers an audio-related task from mobile device 120 to smart speaker 130. For example, cognitive analysis program 200 transfers a song playing on application 126 of mobile device 120 to smart speaker 130 when the operating environment of smart speaker 130 is suitable for an audio-related task. In another embodiment, cognitive analysis program 200 transfers an audio-related task from mobile device 120 to smart speaker 130 via network 110. For example, cognitive analysis program 200 transfers a song playing on mobile device 120 to smart speaker 130 via WPAN and smart speaker 130 continues to play the song. In another example, cognitive analysis program 200 transfers a song playing on mobile device 120 to smart speaker 130 via WLAN and smart speaker 130 continues to play the song.

Figure 3:
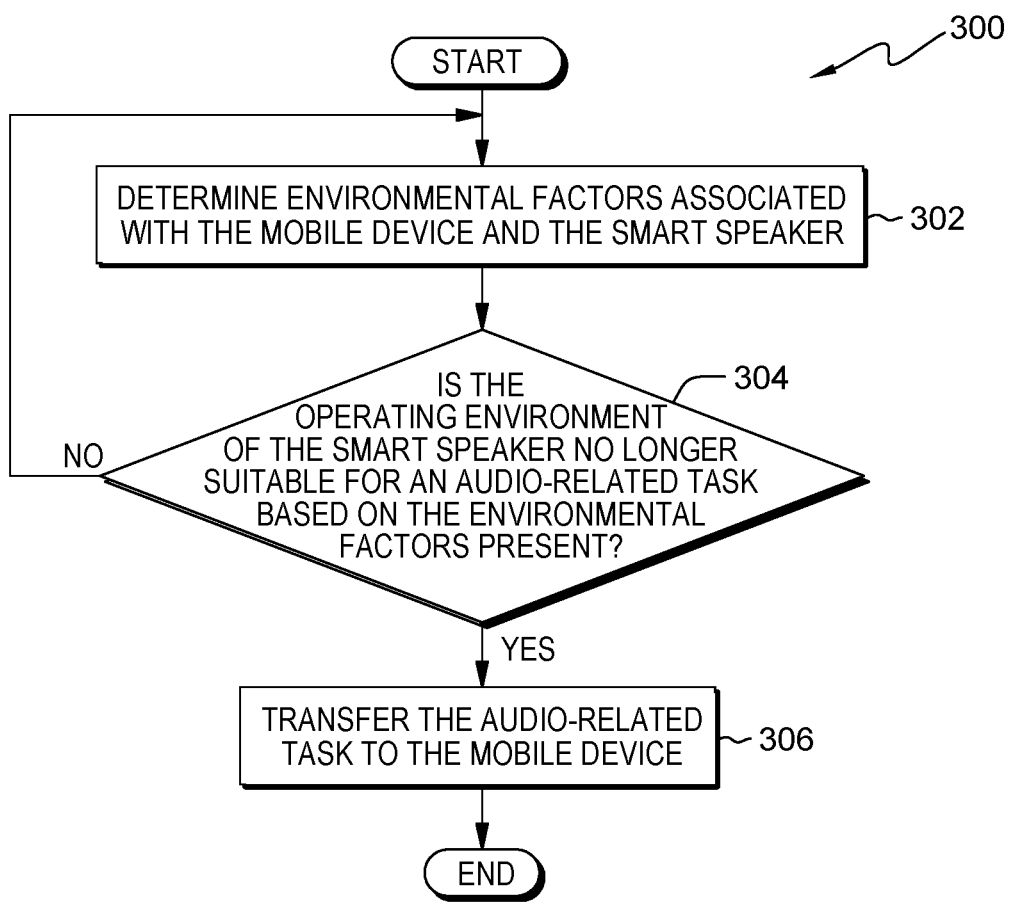
FIG. 3 is a flowchart depicting operational steps of a program for continuing to monitor the suitability of an operating environment of a smart speaker for transfer of an audio-related task from the smart speaker to a mobile device, in accordance with embodiments of the present invention.

FIG. 3 is a flowchart depicting operational steps of cognitive analysis feedback program 300, continuing to monitor the suitability of an operating environment of a smart speaker for transfer of an audio-related task from the smart speaker to a mobile device, in accordance with embodiments of the present invention. In an example embodiment, cognitive analysis feedback program 300 initiates in response to transferring an audio-related task from mobile device 120 to smart speaker 130 (step 212 of cognitive analysis program 200). In various embodiments, suitability of the operating environment for an audio-related task changes with the addition, deduction, or modification of environmental factors. In another example embodiment, cognitive analysis feedback program 300 initiates in response to mobile device 120 playing audio on smart speaker 130.

In step 302, cognitive analysis feedback program 300 determines environmental factors associated with a mobile device, smart speaker, and camera. In one embodiment, cognitive analysis feedback program 300 determines environmental factors associated with mobile device 120, smart speaker 130, and camera 140 present in an operating environment of mobile device 120 and smart speaker 130. For example, cognitive analysis feedback program 300 monitors mobile device 120 for audio usage and movement patterns, smart speaker 130 for spoken conversations and ambient noise, and camera 140 for people and activities of a user of mobile device 120 to determine environmental factors of an operating environment.

In one embodiment, cognitive analysis feedback program 300 monitors audio usage and movement patterns of mobile device 120, smart speaker 130 for spoken conversation and ambient noise, and camera 140 for activities of a user of mobile device 120 and people physically present in an operating environment to detect changes in environmental factors associated with an operating environment.

In another embodiment, cognitive analysis feedback program 300 monitors mobile device 120 to determine environmental factors associated with audio usage and movement patterns of a user of mobile device 120 interacting with mobile device 120. For example, cognitive analysis feedback program 300 uses NLP to detect that a user of mobile device 120 is talking about work related contract over smart speaker 130 and determines that an additional conversation topic is associated with the audio usage environmental factor. In another example, cognitive analysis feedback program 300 monitors motion sensor 128 to detect that mobile device 120 is no longer stationary and is now moving out of the operating environment of smart speaker 130. Further, cognitive analysis feedback program 300 determines that a different movement pattern is associated with the environmental factor of mobile device 120.

In another embodiment, cognitive analysis feedback program 300 monitors smart speaker 130 to determine environmental factors associated with spoken conversation and noise level in the operating environment of smart speaker 130. For example, cognitive analysis feedback program 300 uses a microphone of smart speaker 130 to detect an increase in noise level and uses NLP to determine that multiple conversations are now taking place in the operating environment of smart speaker 130. In another example, cognitive analysis feedback program 300 uses a microphone of smart speaker 130 to detect an increase in noise level and uses audio analysis to determine that a television in use in the operating environment of smart speaker 130.

In another embodiment, cognitive analysis feedback program 300 monitors camera 140 to determine environmental factors associated with the activities of a user of mobile device 120 and people present in the operating environment of smart speaker 130. For example, cognitive analysis feedback program 300 uses video data of camera 140 to determine that another person is now physically present in the operating environment of smart speaker 130 and determines the identity of the new person present in the operating environment of smart speaker 130 using video recognition. In another example, cognitive analysis feedback program 300 uses video data of camera 140 to determine that a user of mobile device 120 is walking with mobile device 120 and determines that a user of mobile device 120 now has bag in his hand while walking using visual analytics.

In decision step 304, cognitive analysis feedback program 300 determines whether the operating environment of the smart speaker is no longer suitable for an audio-related task based on the environmental factors in the operating environment of the smart speaker. Cognitive analysis program 200 considers user activities, attributes of background noise levels, and user privacy to determine whether the operating environment is no longer suitable for an audio-related task. In one embodiment, cognitive analysis feedback program 300 determines whether an operating environment of smart speaker 130 is no longer suitable for an audio-related task based on the environmental factors in the operating environment of smart speaker 130. For example, cognitive analysis feedback program 300 uses the environmental factors (determined in step 302) to determine whether the operating environment of smart speaker 130 is no longer suitable for an audio-related task to remain on smart speaker 130.

In one embodiment, cognitive analysis feedback program 300 determines whether an operating environment of smart speaker 130 is no longer suitable for an audio-related task based on environmental factors and activities of a user of mobile device 120. For example, cognitive analysis feedback program 300 determines a user of mobile device 120 is on a conference call from cognitive analysis feedback program 300 detecting that the phone application (application 126) of mobile device 120 is in use, the speaker phone function of mobile device 120 is on, and the movement patterns received from motion sensor 128 indicates the user of mobile device 120 is holding mobile device 120 while walking out of the operating environment of smart speaker 130. Additionally, cognitive analysis feedback program 300 uses video analytics of camera 140 to determine the user of mobile device 120 is holding mobile device 120 in one hand and is no longer holding a grocery bag in the other hand. Accordingly, cognitive analysis feedback program 300 determines that operating environment of smart speaker 130 is no longer suitable for the conference call, based on the user of mobile device 120 is interacting with mobile device 120 and leaving the operating environment of smart speaker 130.

In one embodiment, cognitive analysis feedback program 300 determines whether an operating environment of smart speaker 130 is no longer suitable for an audio-related task based on environmental factors and attributes of noise levels in the operating environment of smart speaker 130. For example, cognitive analysis feedback program 300 determines that a user of mobile device 120 is conducting a conference call and detects that multiple conversations are occurring in the operating environment of smart speaker 130 using a microphone of smart speaker 130 and NLP. Accordingly, cognitive analysis feedback program 300 determines that the operating environment of smart speaker 130 is no longer suitable for the audio-related task based on the noise level of the conversations in the background. In another example, cognitive analysis feedback program 300 determines that a user of mobile device 120 is conducting a conference call. Additionally, cognitive analysis feedback program 300 determines that a person in the operating environment of smart speaker 130 is watching television using audio analysis of a microphone of smart speaker 130 and video analytics of camera 140. Accordingly, cognitive analysis program 200 determines that operating environment of smart speaker 130 is not suitable for the conference call based on noise level of the television in the operating environment.

In one embodiment, cognitive analysis feedback program 300 determines whether an operating environment of smart speaker 130 is no longer suitable for an audio-related task based on environmental factors and privacy of a user of mobile device 120. In an example embodiment, cognitive analysis feedback program 300 determines the topic of conversations that people within an operating environment of smart speaker 130 are having using NLP and voice identification analysis. Further, cognitive analysis feedback program 300 determines the topic of the conversation that the user of mobile device 120 is having using NLP and voice identification. Additionally, cognitive analysis feedback program 300 determines the identity of people physically present within the operating environment of smart speaker 130 using camera 140 and visual recognition. For example, cognitive analysis feedback program 300 determines that a user of mobile device 120 is ordering a gift for an identified person that is physically present in the operating environment of smart speaker 130. Accordingly, cognitive analysis feedback program 300 determines that the operating environment of smart speaker 130 is no longer suitable for the gift call based on the sensitivity of the call topic and person present. In another example, cognitive analysis feedback program 300 detects an alert of another mobile device attempting to pair with smart speaker 130 and determines that another person is approaching a bedroom containing smart speaker 130. Accordingly, cognitive analysis feedback program 300 determines that the operating environment of smart speaker 130 is no longer suitable for the audio-related task based on the indication that another person is approaching a private area (i.e., bedroom).

In response to determining that an operating environment of smart speaker 130 is suitable for an audio-related task based on environmental factors (decision step 304, "NO" branch), cognitive analysis feedback program 300 returns to step 302 to continue to monitor and determine the environmental factors of associated with the mobile device and smart speaker. In one embodiment, cognitive analysis feedback program 300 continues to monitor mobile device 120, smart speaker 130, and camera 140 to determine the environmental factors of an operating environment of smart speaker. For example, cognitive analysis feedback program 300 continues to monitor the audio usage and movement patterns of mobile device 120, the attributes of noise levels in the operating environment of smart speaker 130, and the activities of the user of mobile device 120 and people physically present in the operating environment of smart speaker 130. In another example, cognitive analysis feedback program 300 continues to determine the environmental factors to determine whether the operating environment of smart speaker 130 is no longer suitable for an audio-related task.

In response to determining that an operating environment of smart speaker 130 is no longer suitable for an audio-related task based on environmental factors (decision step 304, "YES" branch), cognitive analysis feedback program 300 transfers the audio-related task to the mobile device (step 306).

In step 306, cognitive analysis feedback program 300 transfers an audio-related task from a smart speaker to a mobile device. In one embodiment, cognitive analysis feedback program 300 transfers an audio-related task from smart speaker 130 to mobile device 120. For example, cognitive analysis feedback program 300 transfers a song playing on smart speaker 130 to mobile device 120 when the operating environment of smart speaker 130 is no longer suitable for an audio-related task. In another embodiment, cognitive analysis feedback program 300 transfers an audio-related task from smart speaker 130 to mobile device 120 via network 110. For example, cognitive analysis feedback program 300 transfers a song playing on smart speaker 130 to mobile device 120 via WPAN and mobile device 120 continues to play the song. In another example, cognitive analysis feedback program 300 transfers a song playing on smart speaker 130 to mobile device 120 via WLAN and mobile device 120 continues to play the song.

Figure 4:
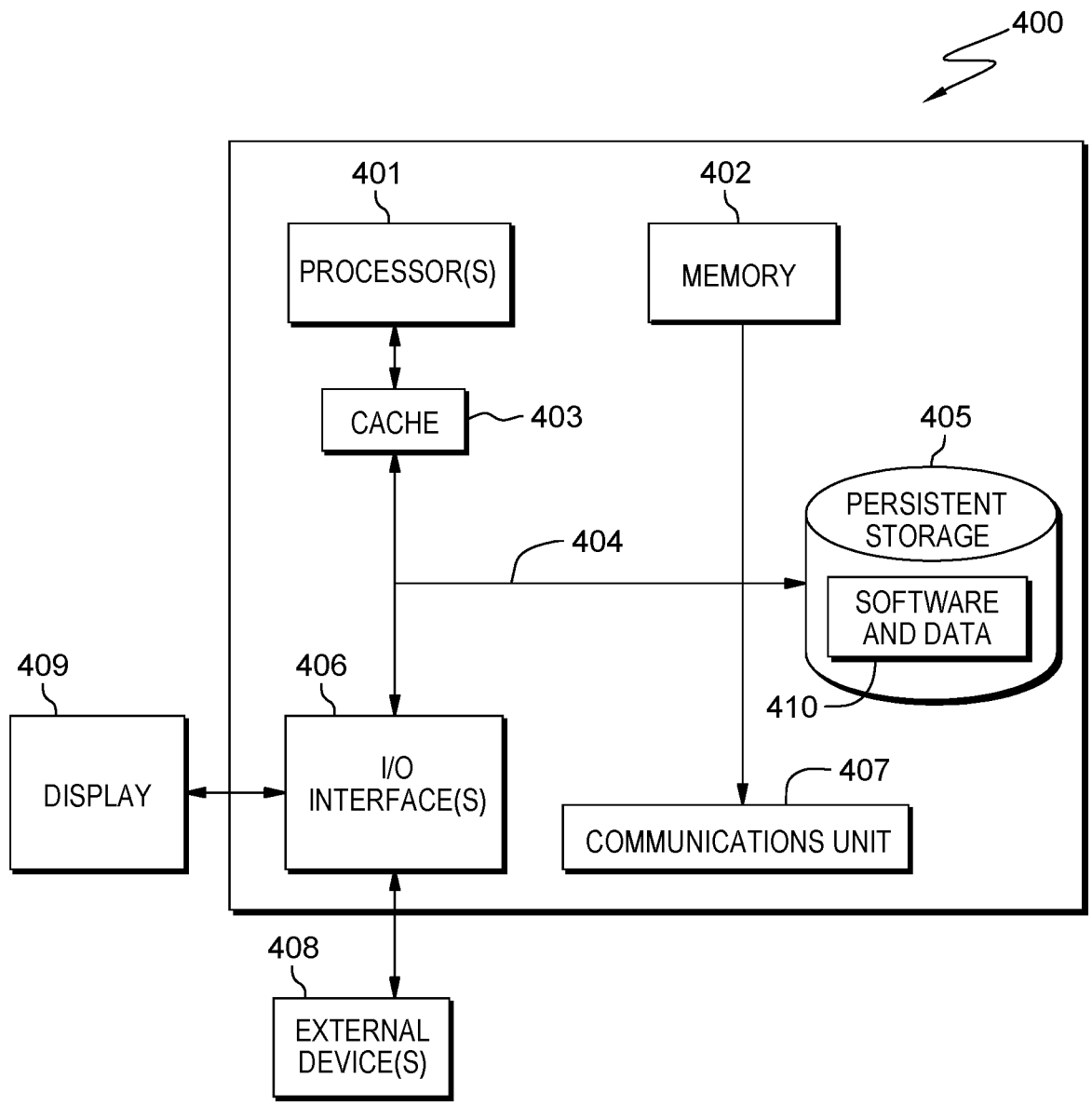
FIG. 4 depicts a block diagram of components of a computing system representative of the mobile device and server of FIG. 1, in accordance with an embodiment of the present invention.

FIG. 4 depicts computer system 400, which is representative of mobile device 120, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made. Computer system 400 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data (e.g., software and data 410) used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 410 can be stored in persistent storage 405 for access and/or execution by one or more of the respective processor(s) 401 via cache 403. With respect to mobile device 120, software and data 410 includes GPS 122, user interface 124, application 126, cognitive analysis program 200, and cognitive analysis feedback program 300.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data (e.g., software and data 410) used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Program instructions and data (e.g., software and data 410) used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for managing audio activity on a mobile device based on environmental factors, the method comprising:
    determining, by one or more processors, that an audio-related task initiates on a mobile device;
    determining, by one or more processors, whether a location of the mobile device is within a threshold proximity to a paired smart speaker;
    in response to determining that the location of the mobile device is within the threshold proximity to the paired smart speaker, determining, by one or more processors, a first set of environmental factors associated with a physical environment proximate the paired smart speaker based on data associated with the mobile device, the paired smart speaker, and the corresponding operating environment, wherein the first set of environmental factors include detected indications of sound within the physical environment proximate to the paired smart speaker; and
    determining, by one or more processors, whether to transfer the audio-related task from the mobile device to the paired smart speaker based on an analysis of the first set of environmental factors in comparison to a defined set of user preferences.

2. The method of claim 1, further comprising:
    in response to determining to transfer the audio-related task from the mobile device to the paired smart speaker based on analysis of the first set of environmental factors in comparison to a defined set of user preferences, transferring, by one or more processors, the audio-related task from the mobile device to the paired smart speaker.

3. The method of claim 2, further comprising:
    in response to transferring the audio-related task from the mobile device to the paired smart speaker, determining, by one or more processors, a second set of environmental factors associated with the physical environment of the paired smart speaker based on data associated with the mobile device, the paired smart speaker, and the corresponding operating environment; and
    determining, by one or more processors, whether to transfer the audio-related task from the paired smart speaker to the mobile device based on an analysis of the second set of environmental factors in comparison to the defined set of user preferences.

4. The method of claim 1:
    wherein the audio-related task is selected from the group consisting of playing audio on the mobile device, conducting a phone call on the mobile device, and interacting with a digital personal assistant on the mobile device, and
    wherein the defined set of user preferences includes user preferences selected from the group consisting of preferences for particular audio-related tasks on the mobile device, indications of activities of a user in the physical environment of the paired smart speaker, attributes of background noise levels, and user privacy preferences.

5. The method of claim 1, wherein determining whether a location of the mobile device is threshold proximity to a paired smart speaker comprises:
    determining, by one or more processors, whether the mobile device is within range of a Wireless Personal Area Network (WPAN) of the paired smart speaker.

6. The method of claim 1, wherein determining the first set of environmental factors associated with the physical environment of the paired smart speaker based on data associated with the mobile device, the paired smart speaker, and the corresponding operating environment, further comprises:
    determining, by one or more processors, the first set of environmental factors based on a video stream received from a camera within the physical environment of the paired smart speaker, wherein environmental factors determined from the video stream individuals within the physical environment and activities performed by the user within the physical environment.

7. The method of claim 1, wherein the determined first set of environmental factors includes environmental factors selected from the group consisting of a noise level within the physical environment of the paired smart speaker, indications of ambient noise within the physical environment, and content of spoken conversations within the physical environment.

8. A computer program product for managing audio activity on a mobile device based on environmental factors, the computer program product comprising:
one or more computer readable storage media and program instructions stored on the one or more computer readable storage media, the program instructions comprising:
program instructions to determine that an audio-related task initiates on a mobile device;
program instructions to determine whether a location of the mobile device is within a threshold proximity to a paired smart speaker;
in response to determining that the location of the mobile device is within the threshold proximity to the paired smart speaker, program instructions to determine a first set of environmental factors associated with a physical environment proximate the paired smart speaker based on data associated with the mobile device, the paired smart speaker, and the corresponding operating environment, wherein the first set of environmental factors include detected indications of sound within the physical environment proximate to the paired smart speaker; and
program instructions to determine whether to transfer the audio-related task from the mobile device to the paired smart speaker based on an analysis of the first set of environmental factors in comparison to a defined set of user preferences.

9. The computer program product of claim 8, further comprising program instructions, stored on the one or more computer readable storage media, to:
in response to determining to transfer the audio-related task from the mobile device to the paired smart speaker based on analysis of the first set of environmental factors in comparison to a defined set of user preferences, transfer the audio-related task from the mobile device to the paired smart speaker.

10. The computer program product of claim 9, further comprising program instructions, stored on the one or more computer readable storage media, to:
in response to transferring the audio-related task from the mobile device to the paired smart speaker, determine a second set of environmental factors associated with the physical environment of the paired smart speaker based on data associated with the mobile device, the paired smart speaker, and the corresponding operating environment; and
determine whether to transfer the audio-related task from the paired smart speaker to the mobile device based on an analysis of the second set of environmental factors in comparison to the defined set of user preferences.

11. The computer program product of claim 8:
wherein the audio-related task is selected from the group consisting of playing audio on the mobile device, conducting a phone call on the mobile device, and interacting with a digital personal assistant on the mobile device, and
wherein the defined set of user preferences includes user preferences selected from the group consisting of preferences for particular audio-related tasks on the mobile device, indications of activities of a user in the physical environment of the paired smart speaker, attributes of background noise levels, and user privacy preferences.

12. The computer program product of claim 8, wherein the program instructions to determine whether a location of the mobile device is within a threshold proximity to a paired smart speaker further comprise program instructions to:
determine whether the mobile device is within range of a Wireless Personal Area Network (WPAN) of the paired smart speaker.

13. The computer program product of claim 8, wherein the program instructions to determine a first set of environmental factors associated with a physical environment of the paired smart speaker based on data associated with the mobile device, the paired smart speaker, and the corresponding operating environment further comprise program instructions to:
determine the first set of environmental factors based on a video stream received from a camera within the physical environment of the paired smart speaker, wherein environmental factors determined from the video stream individuals within the physical environment and activities performed by the user within the physical environment.

14. The computer program product of claim 8, wherein the determined first set of environmental factors includes environmental factors selected from the group consisting of a noise level within the physical environment of the paired smart speaker, indications of ambient noise within the physical environment, and content of spoken conversations within the physical environment.

15. A computer system for managing audio activity on a mobile device based on environmental factors, the computer system comprising:
one or more computer processors;
one or more computer readable storage media; and
program instructions stored on the computer readable storage media for execution by at least one of the one or more processors, the program instructions comprising:
program instructions to determine that an audio-related task initiates on a mobile device;
program instructions to determine whether a location of the mobile device is within a threshold proximity to a paired smart speaker;
in response to determining that the location of the mobile device is within the threshold proximity to the paired smart speaker, program instructions to determine a first set of environmental factors associated with a physical environment proximate the paired smart speaker based on data associated with the mobile device, the paired smart speaker, and the corresponding operating environment, wherein the first set of environmental factors include detected indications of sound within the physical environment proximate to the paired smart speaker; and
program instructions to determine whether to transfer the audio-related task from the mobile device to the paired smart speaker based on an analysis of the first set of environmental factors in comparison to a defined set of user preferences.

16. The computer system of claim 15, further comprising program instructions, stored on the computer readable storage media for execution by at least one of the one or more processors, to:
in response to determining to transfer the audio-related task from the mobile device to the paired smart speaker based on analysis of the first set of environmental factors in comparison to a defined set of user preferences, transfer the audio-related task from the mobile device to the paired smart speaker.

17. The computer system of claim 16, further comprising program instructions, stored on the one or more computer readable storage media, to:
in response to transferring the audio-related task from the mobile device to the paired smart speaker, determine a second set of environmental factors associated with the physical environment of the paired smart speaker based on data associated with the mobile device, the paired smart speaker, and the corresponding operating environment; and
determine whether to transfer the audio-related task from the paired smart speaker to the mobile device based on an analysis of the second set of environmental factors in comparison to the defined set of user preferences.

18. The computer system of claim 15:
wherein the audio-related task is selected from the group consisting of playing audio on the mobile device, conducting a phone call on the mobile device, and interacting with a digital personal assistant on the mobile device,
wherein the defined set of user preferences includes user preferences selected from the group consisting of preferences for particular audio-related tasks on the mobile device, indications of activities of a user in the physical environment of the paired smart speaker, attributes of background noise levels, and user privacy preferences, and
wherein the determined first set of environmental factors includes environmental factors selected from the group consisting of a noise level within the physical environment of the paired smart speaker, indications of ambient noise within the physical environment, and content of spoken conversations within the physical environment.

19. The computer system of claim 15, wherein the program instructions to determine whether a location of the mobile device is within a threshold proximity to a paired smart speaker further comprise program instructions to:
determine whether the mobile device is within range of a Wireless Personal Area Network (WPAN) of the paired smart speaker.

20. The computer system of claim 15, wherein the program instructions to determine a first set of environmental factors associated with a physical environment of the paired smart speaker based on data associated with the mobile device, the paired smart speaker, and the corresponding operating environment further comprise program instructions to:
determine the first set of environmental factors based on a video stream received from a camera within the physical environment of the paired smart speaker, wherein environmental factors determined from the video stream individuals within the physical environment and activities performed by the user within the physical environment.

* * * * *